United States Patent
Su

(10) Patent No.: US 8,331,090 B2
(45) Date of Patent: Dec. 11, 2012

(54) PORTABLE COMPUTER DEVICE WITH EXTENDABLE DISPLAY

(75) Inventor: Hung-Ti Su, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 270 days.

(21) Appl. No.: 12/912,769

(22) Filed: Oct. 27, 2010

(65) Prior Publication Data

US 2012/0050987 A1 Mar. 1, 2012

(30) Foreign Application Priority Data

Aug. 31, 2010 (CN) .......................... 2010 1 0268018

(51) Int. Cl.
*G06F 1/16* (2006.01)
(52) U.S. Cl. ................ 361/679.55; 345/207; 455/575.4; 200/527; 349/75
(58) Field of Classification Search .................... 345/1.1, 345/207, 173, 169, 174, 204, 156, 30, 157, 345/3.1; 361/679.01, 679.27, 679.02, 679.26, 361/679.09, 679.08, 679.55, 679.4, 679.48, 361/679.41, 679.43, 679.3, 679.07, 679.37, 361/679.05; 455/558, 556.1, 550.1, 575.4, 455/575.1; 200/5 A, 547, 341, 527, 4; 312/223.1, 312/223.6, 223.2, 319.7; 349/5, 6, 10, 61, 349/75

See application file for complete search history.

(56) References Cited

U.S. PATENT DOCUMENTS

| | | | | |
|---|---|---|---|---|
| 7,019,964 | B1 * | 3/2006 | Maskatia et al. | 361/679.27 |
| 2005/0253775 | A1 * | 11/2005 | Stewart | 345/1.1 |
| 2009/0102744 | A1 * | 4/2009 | Ram | 345/1.1 |
| 2011/0194232 | A1 * | 8/2011 | Saila | 361/679.01 |

* cited by examiner

*Primary Examiner* — Hung Duong
(74) *Attorney, Agent, or Firm* — Altis Law Group, Inc.

(57) ABSTRACT

A portable computer device includes a main body and an extendable display. The main body includes an upper portion and the lower portion. The extendable display includes a left portion rotatably connected to the upper portion and a right portion. The left portion is rotatably connected to the upper portion, and includes a first side surface. The right portion is movably connected to lower portion, and includes a second side surface. The right portion is able to slide together with the lower portion along a first direction to a predetermined position. The right portion is able to move relative to the lower portion until the second side surface engages the first side surface, causing the left portion to be flush with the right portion.

11 Claims, 4 Drawing Sheets

PORTABLE COMPUTER DEVICE WITH EXTENDABLE DISPLAY

BACKGROUND

1. Technical Field

The present disclosure relates to portable computer devices and, particularly, to a portable computer device with an extendable display.

2. Description of Related Art

A notebook computer usually includes one display. Due to the limitation of its size, notebook computers use liquid-crystal displays as a display instead of the CRTs used in desktop displays. However, liquid-crystal displays show images in soft quality, the images become unclear if the viewer views the images from an improper angle.

Therefore, what is needed is a portable computer device with an extendable display to overcome the described shortcoming.

DETAILED DESCRIPTION

Figure 1:
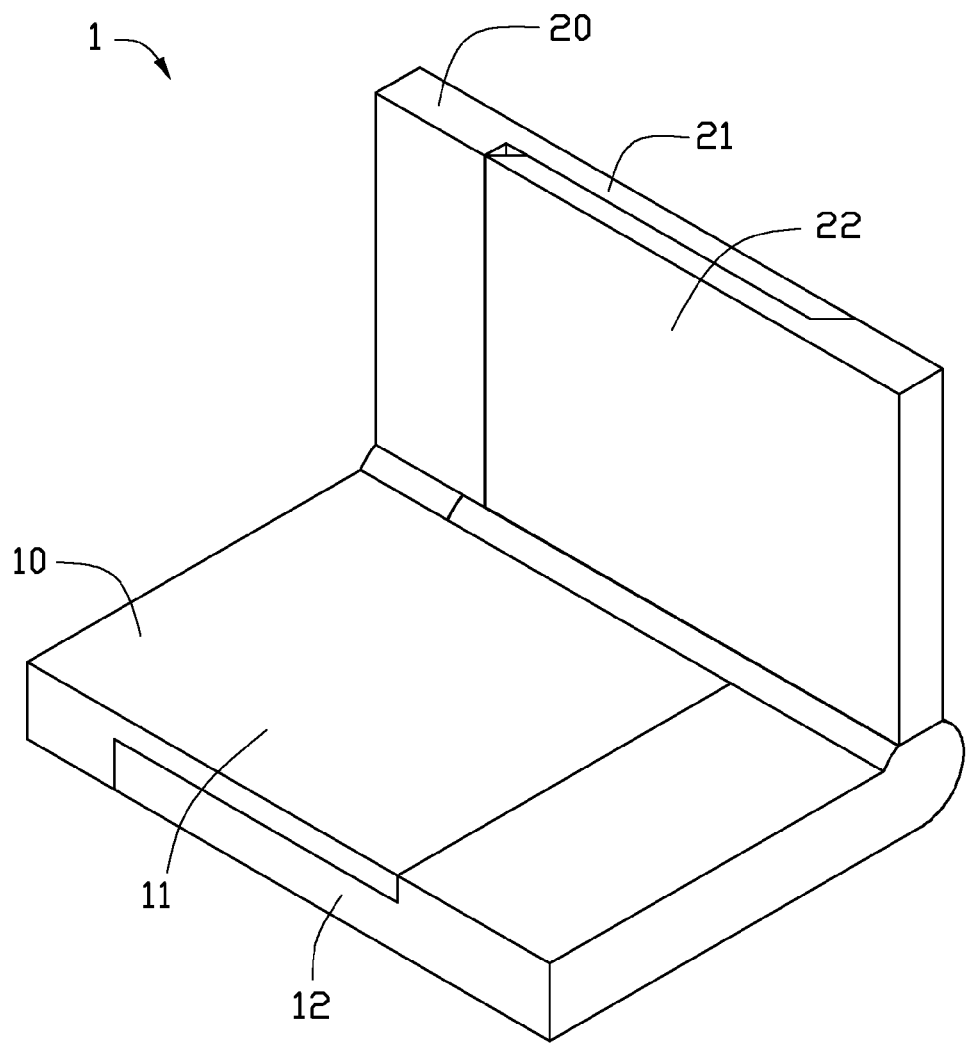
FIG. 1 is an isometric, schematic view of a portable computer device with an extendable display, in accordance with an exemplary embodiment.
Figure 2:
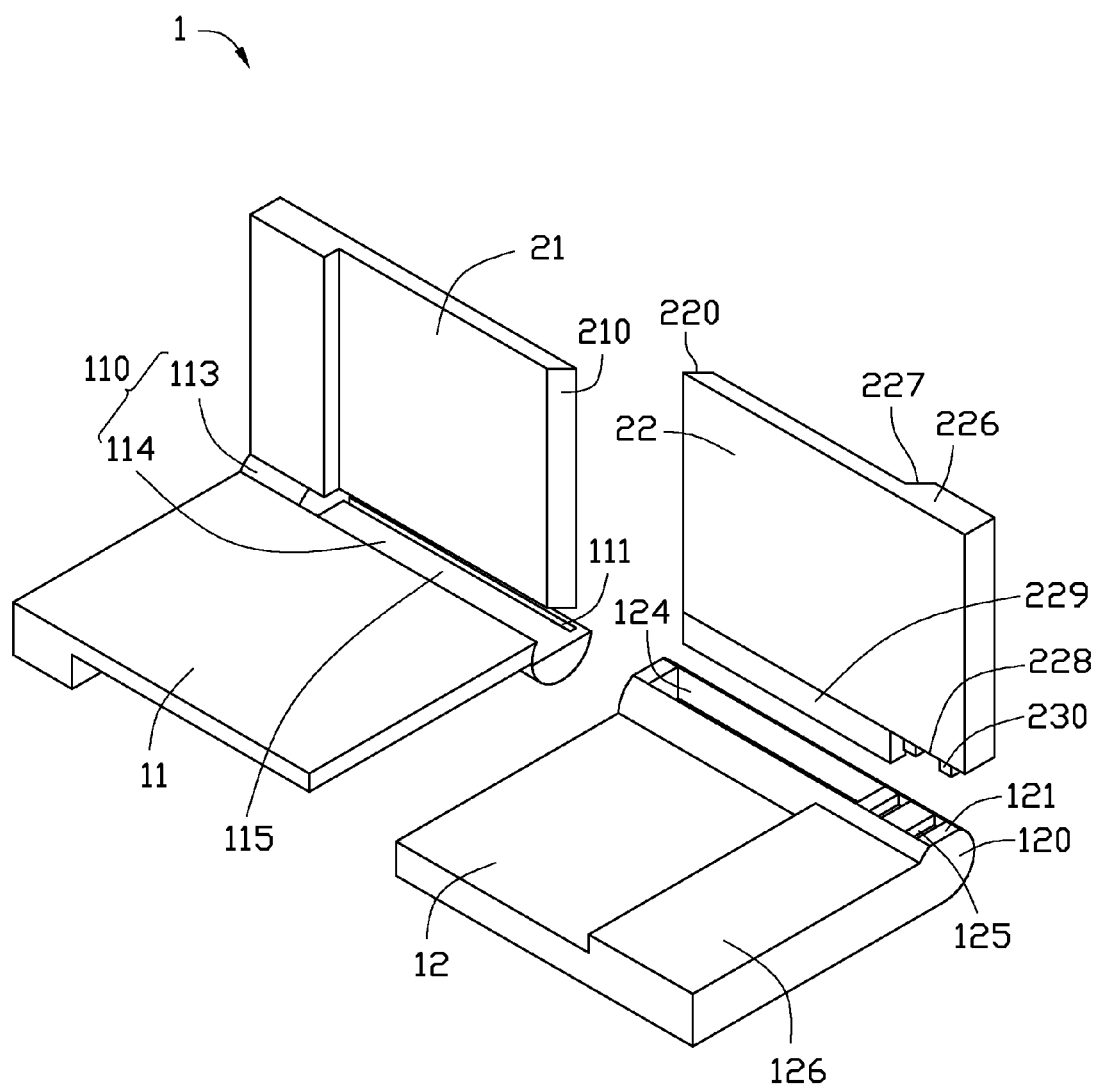
FIG. 2 is an exploded view of the portable computer device of FIG. 1.
Figure 3:
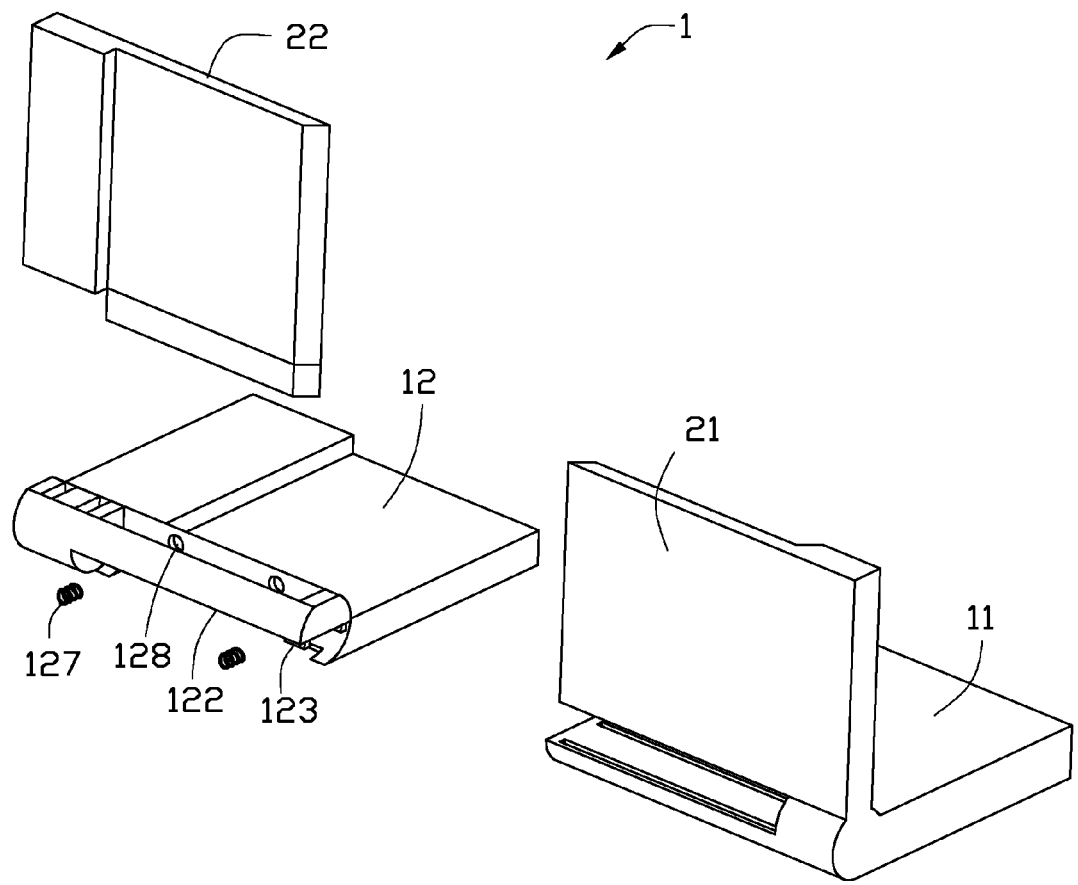
FIG. 3 is similar to FIG. 2, but viewed from another aspect.

Referring to FIGS. 1-3, an embodiment of a portable computer device 1 is illustrated. The portable computer device 1 includes a main body 10 and an extendable display 20 rotatably connected to the main body 10. In one embodiment, the portable computer device can be a notebook computer.

The main body 10 includes an upper portion 11 and a lower portion 12 slidably connected to the upper portion 11. The extendable display 20 includes a left portion 21 and a right portion 22. The left portion 21 is rotatably connected to the upper portion 11, and includes a first side surface 210. The right portion 22 is movably connected to the lower portion 12, and includes a second side surface 220. In one embodiment, the first side surface 210 and the second side surface 220 are inclined surfaces.

When attempting to extend the extendable display 20, the lower portion 12 can be pushed to cause the right portion 22 to slide away from the upper portion 11 along a first direction to a predetermined position. Then, the right portion 22 is pushed to move along a second direction until the second side surface 220 engages the first side surface 210.

When attempting to close the extendable display 20, the right portion 22 is pushed to move causing the second side surface 220 to disengage from the first side surface 210. Then, the lower portion 12 is pushed causing the right portion 22 to slide until the right portion 22 engages with the left portion 21. In order to better understand the disclosure, an exemplary embodiment will be described in detail.

The upper portion 11 includes a first extendable member 110 at one end. The first extendable member 110 includes a connection portion 113 and a slidable portion 114. The connection portion 113 is used for rotatably connecting the extendable display 20 to the upper portion 11 of the main body 10. The slidable portion 114 includes a top surface 115 opposing the bottom of the left portion 21 of the display 20. The slidable portion 114 defines at least one sliding groove 111 in the top surface 115 along a lengthwise direction of the upper portion 11. In one embodiment, the number of the sliding grooves 111 is two.

The lower portion 12 includes a second extendable member 120 arranged between the first extendable member 110 and the left portion 21 of the display 20, and a first protruding portion 126. The first protruding portion 126 protrudes from a top surface (not labeled) of the lower portion 12. The second extendable member 120 is a semi-cylinder, and includes a top surface 121 and lower surface 122 opposing the top surface 115 of the slidable portion 114. At least one protrusion 123 protrudes downward from one end of the lower surface 122, and is slidably received in the sliding groove 111. In one embodiment, the number of the at least one protrusion 123 is two. The top surface 121 defines two slots 125 along the widthwise direction and a hollow space 124 along its lengthwise direction. The lower portion 12 defines at least one hole 128 communicating with the hollow space 124 in its lateral surface. An elastic element 127 is received in the at least one hole 128. In one embodiment, the elastic element 127 is a spring. The number of the at least one hole 128 is two.

The right portion 22 of the extendable display 20 includes a bottom surface 228, an extendable portion 229 extending from the bottom surface 228 along a lengthwise direction, two posts 230 and a second protruding portion 226 extending from the bottom surface 228 along a widthwise direction. The bottom surface 228 is substantially perpendicular to the second side surface 220. The extendable portion 229 is movably received in the hollow space 124, and can move toward or away from the hole 128 in the hollow space 124 with help from an external force, causing the right portion 22 to move relative to the lower portion 12. The extendable portion 229 is further connected to one end of the elastic element 127. The two posts 230 are respectively slidably received in the two slots 125. The second protruding portion 226 protrudes from a lateral surface (not labeled) of the right portion 22 of the extendable display 20, and includes a third side surface 227 engaging with the first side surface 210. In one embodiment, the third side surface 227 is an inclined surface.

Figure 4:
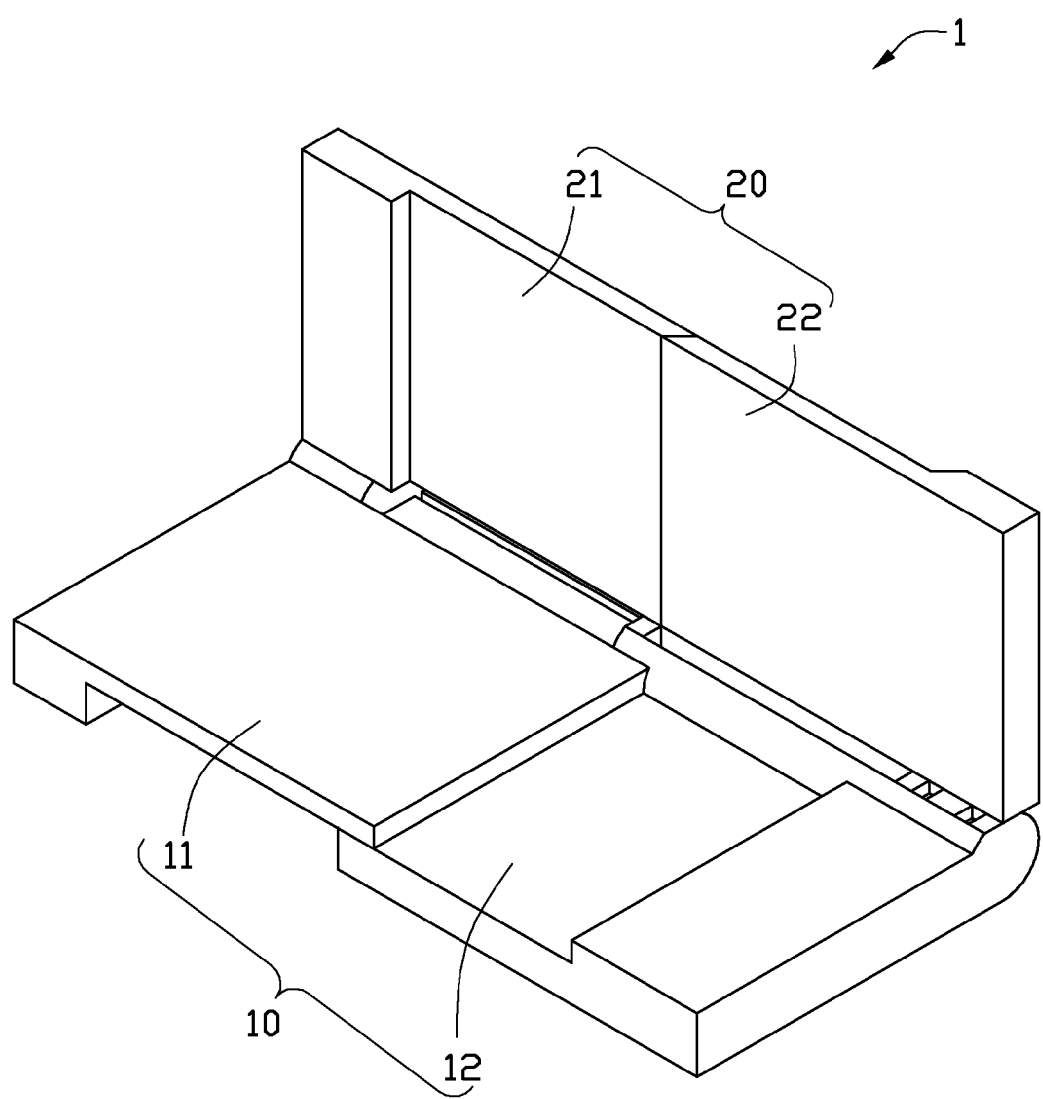
FIG. 4 shows the extendable display of the portable computer device of FIG. 1 in an extended state.

Referring to FIG. 4, when attempting to extend the extendable display 20, the first protruding portion 126 is pushed to move away from the upper portion 11 until the two protrusions 123 stay in contact with the edge of the sliding groove 111. The second protruding portion 226 is forced to drive the extendable portion 229 to move in the hollow space 124. The two posts 230 respectively slide in the two slots 125 along a direction away from the hole 128 until the second side surface 220 engages with the first side surface 210, causing the extendable display 20 to be extended. During movement, the extendable portion 229 stretches the elastic element 127. Friction between the two posts 230 and the two slots 125 exceed the elastic force of the elastic element 127. The extendable portion 229 and the two posts 230 are respectively kept in a position in the hollow space 124 and the two slots 125 away from the hole 128, thereby keeping the extendable display 20 steady.

When closing the extendable display 20, the second protruding portion 226 is pushed to drive the extendable portion 229 to move in the hollow space 124 and the two posts 230 to slide in the two slots 125 along a direction adjacent to the hole 128 until the second side surface 220 disengages from the first side surface 210. Then, the first protruding portion 126 is forced to drive the two protrusions 123 to slide in the two sliding grooves 111 along a direction adjacent to the upper portion 11 until the third side surface 227 engages with the first side surface 210, causing the extendable display 20 to close.

In another embodiment of the disclosure, the elastic element 127 can be replaced by a magnet (not labeled), and the lower extendable portion 229 can be made of ferromagnetic material, and can be attracted by the magnet, thereby keeping the extendable portion 229 in a predetermined position in the hollow space 123.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A portable computer device comprising:
   a main body comprising an upper portion and a lower portion slidably connected to the upper portion; and
   an extendable display comprising:
      a left portion rotatably connected to the upper portion, and comprising a first side surface; and
      a right portion movably connected to lower portion, and comprising a second side surface;
      wherein the right portion is able to slide together with the lower portion along a first direction to a predetermined position, the right portion is able to move relative to the lower portion until the second side surface engages with the first side surface, causing the left portion to be flush with the right portion.

2. The portable computer device as described in claim 1, wherein the upper portion comprises a first extendable member extending from a sidewall, the first extendable member comprises a connection portion and a slidable portion, the connection portion is configured for rotatably connecting the left portion of the extendable display to the upper portion of the main body.

3. The portable computer device as described in claim 2, wherein the slidable portion defines at least one sliding groove along a lengthwise direction of the upper portion, the lower portion of the main body comprises a lower surface and a top surface opposing to the lower surface, at least one protrusion protrudes from one end of the lower surface adjacent the left portion, the at least one protrusion is slidably received in the at least one sliding groove, thereby slidably connecting the lower portion to the upper portion of the main body.

4. The portable computer device as described in claim 3, wherein the top surface defines a hollow space along a lengthwise direction of the lower portion, the right portion of the extendable display comprises a bottom surface substantially perpendicular to the second side surface, an extendable portion extending from the bottom surface, the extendable portion is movably received in the hollow space, thereby movably connecting the right portion of the display to the lower portion of the main body.

5. The portable computer device as described in claim 4, wherein the top surface further defines at least one slot along a widthwise direction of the lower portion, the right portion of the extendable display further comprises at least one post extending from the bottom surface, the at least one post is slidably connected to the at least one slot.

6. The portable computer device as described in claim 5, wherein the numbers of the at least one slot and the at least one post are two.

7. The portable computer device as described in claim 4, wherein the lower portion defines at least one hole in its lateral surface, and communicating with the hollow space, the at least one hole is configured for receiving an elastic element, one end of the elastic element is connected to the extendable portion, thereby keeping the extendable portion in a predetermined position in the hollow space.

8. The portable computer device as described in claim 4, wherein the lower portion defines at least one hole in its lateral surface, and communicating with the hollow space, the at least one hole is configured for receiving a magnet, the extendable portion is made of ferromagnetic material, and is attracted by the magnet, thereby keeping the extendable portion in a predetermined position in the hollow space.

9. The portable computer device as described in claim 2, wherein the numbers of the at least one sliding groove and the at least one protrusion are two.

10. The portable computer device as described in claim 1, wherein the lower portion of the main body comprises a first protruding portion protruding from its top surface, the right portion of the display comprises a second protruding portion protruding from its lateral surface, the second protruding portion defines a third side surface, during closing the extendable display, the second protruding portion is pushed to drive the right portion to move relative to the lower portion until the second side surface disengages from the first side surface, then first protruding portion is forced to drive the lower portion to slide relative to the upper portion until the third side surface engages the first side surface, causing the extendable display to close.

11. The portable computer device as described in claim 10, wherein the first side surface, the second side surface and the third side surface are inclined surfaces.

* * * * *